United States Patent
Kersten, Jr. et al.

[15] 3,692,046
[45] Sept. 19, 1972

[54] VANDAL PROOF VALVE CONTROL ASSEMBLY

[72] Inventors: Samuel D. Kersten, Jr., Highland Park, Ill. 60035; Alton F. Sautter, Chicago, Ill. 60646; John M. Simon, Downers Grove, Ill. 60515

[73] Assignee: Water Saver Faucet Co., Chicago, Ill.

[22] Filed: May 28, 1971

[21] Appl. No.: 148,011

[52] U.S. Cl. ............................................. 137/382
[51] Int. Cl. ............................................ F16k 27/12
[58] Field of Search .................. 137/377, 382, 382.5

[56] References Cited

UNITED STATES PATENTS 2,668,680   2/1954   Moser ...................... 137/382

Primary Examiner—Henry T. Klinsiek
Attorney—Wallenstein, Spangenberg, Hattis & Strampel

[57] ABSTRACT

A vandal proof valve control assembly adapted to be mounted on a panel of a fume hood, for example. One embodiment of the assembly comprises an angled member to one leg of which a valve is secured. The other leg is provided with an opening to enable a portion of the control handle on the valve to protrude therethrough whereby the valve may be regulated while access to the valve, and the means employed to secure the control handle on the valve, is prevented. The angled member may be of sufficient length to accommodate a plurality of valves, and advantageously is located at a position which is remote from the fixture regulated by the valve secured thereon.

7 Claims, 6 Drawing Figures

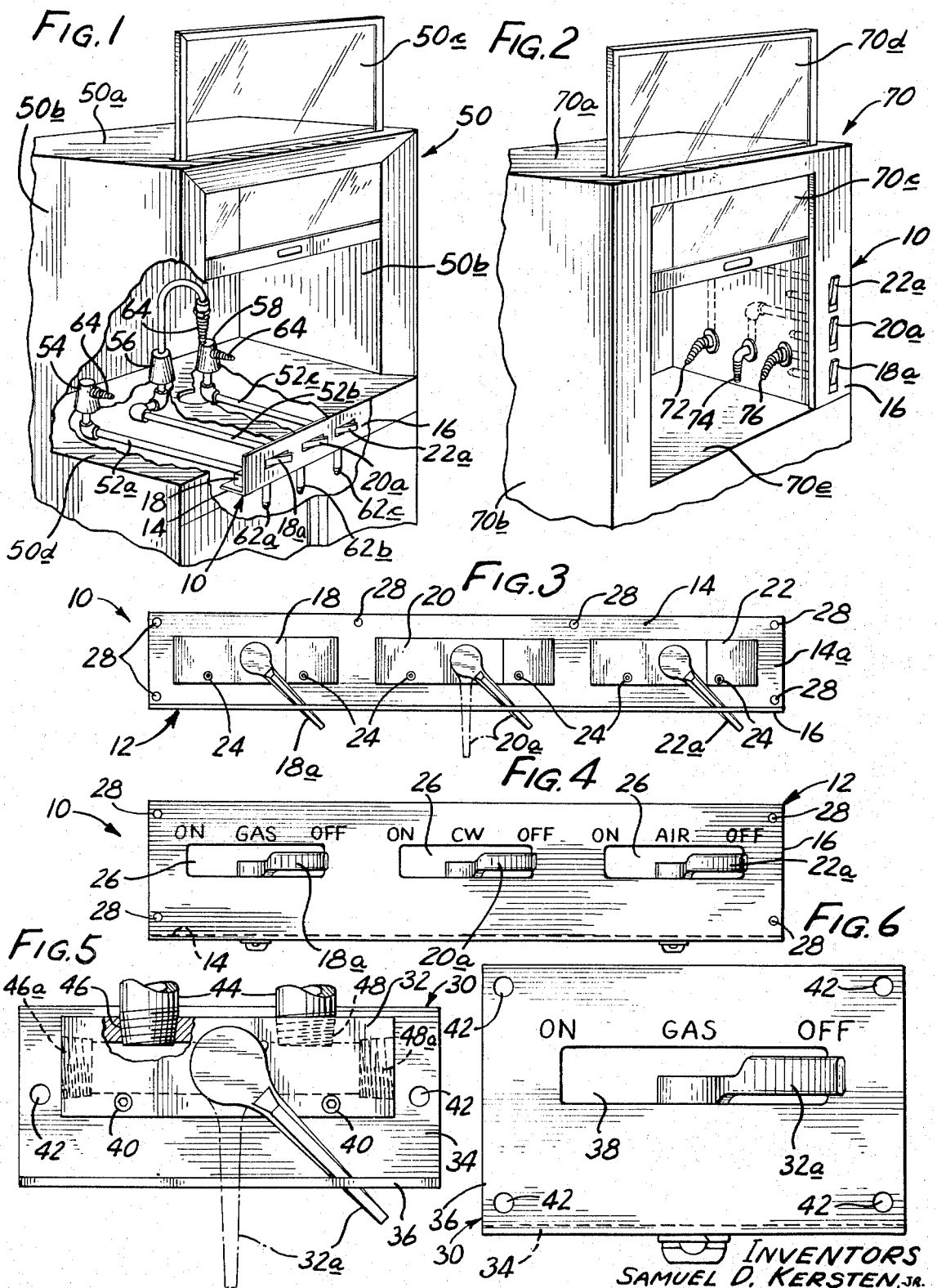

VANDAL PROOF VALVE CONTROL ASSEMBLY

The present invention relates to a valve control assembly adapted to prevent unauthorized access to a valve, and the means employed to mount a control handle on the valve.

A vexing, and costly, problem to school administrators, both at the high school and college levels, is the frequency with which expensive laboratory equipment and apparatus is willfully damaged. This activity is directed not only at frangible items, but also at hardware and fixtures. More specifically in this latter connection, it is not uncommon to find that the control handles of valves for regulating water, gas, air and vacuum fixtures, for example, have been completely removed. Apart from the expense and inconvenience involved in the replacement of such items, the removal of the control handles, and/or damage to the valves to which the handles are attached, constitute a hazard, especially in those instances where the valves are of the natural, or special gas type.

In accordance with the present invention, a valve control assembly is provided which effectively prevents unauthorized access to a valve, and the means employed for securing a control handle on the valve, while at the same time enabling the valve to be readily controlled by its control handle. The assembly can be made to accommodate a plurality of valves, and can be mounted in any convenient position desired with relation to the fixtures to be connected to the valves associated with the assembly. The assembly is particularly adaptable for use in connection with laboratory equipment such as fume hoods wherein one or more fixtures are mounted in the hood in remote relation to their associated regulating valves.

Briefly, the vandal proof valve control assembly of this invention comprises in combination an angled member having a valve supporting portion and a valve concealing portion, said portions being joined along one of their margins at substantially a right angle to one another. The angled member is adapted to be mounted on a support panel, or work table, with the inner, intersecting adjacent faces thereof substantially concealed. One, or more, valves are secured on the inner face of the valve supporting portion of the angled member. The valve concealing portion of the angled member is provided with an opening, or openings, corresponding in number to the number of valves secured on the valve supporting portion, to enable a portion of the control handle of the valve, or valves, to extend therethrough. This arrangement permits the control handle to be moved to a full "on" or "off" position without hindrance, while preventing unauthorized access to the valve and the valve control handle mounting means. The assembly can be secured to a support panel, or work table, with the valve concealing portion of the angled member vertically or horizontally oriented with relation to the upper surface of the panel, or the table, or, in the case of a fume hood, the assembly can be mounted along the side wall of the hood. The valves secured on the valve supporting portion of the angled member can be the same or different, and advantageously are of the type conventionally used for regulating water, gas, air, vacuum, or the like.

These and other features and advantages of the invention will be more fully appreciated and understood from the following detailed description when taken in conjunction with the accompanying drawing wherein like reference numerals throughout the various views of the drawing are intended to designate similar elements or components:

FIG. 1 is a fragmentary view in perspective of an embodiment of the vandal proof valve control assembly mounted on the bottom, or work table, panel of a fume hood;

FIG. 2 is a view corresponding to the view of FIG. 1 showing said embodiment mounted on a vertical panel along one side of a fume hood;

FIG. 3 is a top plan view of an embodiment of the vandal proof valve control assembly showing three valves secured thereon;

FIG. 4 is a front view in elevation of the embodiment illustrated in FIG. 3;

FIG. 5 is a top plan view of another embodiment of the assembly with a single valve secured thereon, a portion being broken away to show connection of the valve to a conduit; and FIG. 6 is a front view in elevation of the embodiment shown in FIG. 5.

Referring, now, to FIGS. 3 and 4, in particular, of the drawing, the embodiment of the vandal proof valve control assembly 10 illustrated comprises and elongated, angled member 12 desirably fabricated of a metal such as aluminum or stainless steel which is resistant to attack by fluids of the type encountered in a high school or college laboratory. The angled member 12 has a valve supporting leg or portion 14 and a valve concealing leg or portion 16. As shown, the portions 14 and 16 are joined along one of their longitudinal margins at substantially a right angle to one another.

In the embodiment illustrated, the valve supporting leg or portion 14 has three valves 18, 20 and 22 secured in spaced relation on the inner surface 14a thereof. The valves 18, 20 and 22 are of standard design and construction, and, as shown, each is used for regulating the flow of a different substance. Thus, the valve 18 is a natural gas regulating valve; the valve 20 is a cold water regulating valve; and the valve 22 is a compressed air regulating valve. The valves may be secured to the valve supporting leg or portion 14 by screws 24 which pass through the body of the valves into tapped holes formed in the portion 14.

Each of the valves 18, 20 and 22 has a single-arm control handle 18a, 20a and 22a, respectively, secured on the valve stem thereof. A portion of each of the handles extends through narrow, elongated rectangular openings 26 formed in the valve concealing leg or portion 16. The openings 26 are spaced to align them with the valves 18, 20 and 22 secured on the leg or portion 14, and are of sufficient length to enable the handles 18a, 20a and 22a to be moved to a full "on" or "off" position. The width of the openings 26 is such that access to the valves, and the valve control handle mounting means, is prevented, or at least rendered ineffective in the event a tool, such as a screwdriver, is used. While the handles 18a, 20a and 22a are of the single-arm type, it should be understood that four-arm handles, wheel handles, or other manually operated valve control means can be employed to regulate the valves 18, 20 and 22.

A plurality of holes 28 are provided in the portions 14 and 16 of the member 12 to enable the assembly to be mounted on a support panel, or work table, by means of screws, bolts, or the like.

The assembly of the present invention can be made any size desired to meet a particular need. Thus, for example, as illustrated in FIGS. 5 and 6, the angled member 30 has a single valve 32 secured on the valve supporting leg or portion 34 thereof. The valve concealing leg or portion 36 of the member 30, in turn, is provided with one opening 38 through which a portion of the control handle 32a of the valve 32 extends. As with the previously described embodiment, the valve 32 may be held on the leg or portion 34 by means of machine screws 40, and openings 42 may be provided in the legs or portions 34 and 36 to enable the assembly to be mounted on a support panel, or work table, by screws, bolts, or the like. Conduits or nipples 44—44 are shown connected to the inlet 46 and the outlet 48 of the valve 32. An alternate end inlet 46a and end outlet 48a are provided for the valve 32, both of which, of course, are plugged when the inlet 46 and the outlet 48 are used.

As indicated hereinabove, the vandal proof valve control assembly of this invention is especially adapted for use in connection with fume hoods of the type used in high school and college laboratories. In FIGS. 1 and 2 of the drawing, typical embodiments of fume hoods utilizing the assembly 10 of this invention are illustrated. The fume hood 50, as shown in FIG. 1, comprises an enclosure having a top wall 50a, side walls 50b—50b, a slidable framed-glass front panel 50c and a bottom work panel or table 50d. The assembly 10 is mounted on the front end of the table 50d so that the valves 18, 20 and 22 secured on the valve supporting leg or portion 14 of the angled member, are concealed and inaccessable to a user of the hood. Each of the valves is connected by a conduit or nipple 52a, 52b and 52c, respectively, to a gas fixture 54, a water fixture 56 and a compressed air fixture 58 mounted on the work panel or table 50d within the hood in remote relation to the valves 18, 20 and 22. The valves are connected to sources of gas, water and compressed air through conduits 62a, 62b and 62c. The fixtures are each provided with a serrated, hose-receiving outlet end 64. The portion of each control handle 18a, 20a and 22a extending through the openings 26 in the valve concealing leg or portion 16 of the member 10 enables complete regulation of flow from the fixtures while the slidable front panel 50c of the hood is in an open or closed position. The assembly 10 can be mounted on the bottom work panel or table 50d to position the valve concealing leg or portion 16 in a horizontal plane thereby enabling control of the valves at the upper surface of the work panel or table 50d rather than along the front edge thereof as illustrated in FIG. 1.

The fume hood 70 illustrated in FIG. 2, like the fume hood 50, comprises an enclosure having a top wall 70a, side walls 70b and 70c, a slidable glass-framed front panel 70d and a bottom work panel or table 70e. The assembly 10, however, is secured along the side of the hood and the fixtures for air 72, water 74, and gas 76 are mounted on the side wall 70c. The valves and the plumbing necessary for connecting the valves to the fixtures are positioned behind the side wall 70c, and the valve concealing leg or portion 16 of the assembly 10 prevents access to the valves and the valve control handle mounting means.

While for purposes of illustration preferred embodiments of this invention have been shown and described, other forms thereof may become apparent to those skilled in the art upon reference to this disclosure and, therefore, it should be understood that any such departures from the specific embodiment shown and described are intended to fall within the spirit and scope of this invention.

What is claimed is:

1. A vandal proof valve control assembly adapted for connection to one or more fixtures for regulating water, gas, air, vacuum, or the like, comprising in combination an angled member having a valve supporting portion and a valve concealing portion, said portions being joined along a margin thereof at substantially a right angle to one another, said angled member being adapted to be mounted on a support panel with the inner adjacent faces of the valve supporting portion and the valve concealing portion being substantially concealed, and a valve mounted on the concealed inner face of the valve supporting portion of the angled member, said valve having a control handle mounted thereon, the valve concealing portion of the angled member having an opening to enable a portion of the valve control handle to extend therethrough whereby the valve may be regulated while access to the valve and the valve control handle mounting means of the assembly is prevented.

2. An assembly according to claim 1 wherein the angled member and its associated valve are mounted in a position remote from the fixture controlled by the valve.

3. An assembly according to claim 1 wherein the opening in the valve concealing portion of the angled member is substantially rectangular and is of a length to enable the control handle of the valve to move to a full "on" or "off" position without hindrance.

4. An assembly according to claim 1 wherein a plurality of valves are mounted in spaced relation on the valve supporting portion of the angled member, and the valve concealing portion of said member has an equivalent number of correspondingly spaced openings to enable a portion of each control handle mounted on the valves to extend therethrough.

5. In an enclosure provided with one or more fixtures for supplying water, gas, air, vacuum, or the like, from a source thereof to equipment or apparatus positioned on a panel comprising the working surface of the enclosure, the improvement comprising a vandal proof valve control assembly mounted on the exterior of the enclosure and connected to the fixtures in the enclosure, said assembly comprising, in combination, an angled member having a valve supporting portion and a valve concealing portion, said portions being joined along a margin thereof at substantially a right angle to one another, said angled member being mounted on the enclosure with the inner adjacent faces of the valve supporting portion and the valve concealing portion being substantially concealed, and a valve mounted on the concealed inner face of the valve supporting portion of the angled member, said valve having a control handle mounted thereon, the valve concealing portion of the angled member having an opening to enable a portion of the valve control handle to extend therethrough whereby water, gas, air, vacuum, or the like, supplied by the fixture or fixtures positioned in the enclosure may be regulated from outside the enclosure while access to the valve and the valve control handle mounting means of the assembly is prevented.

6. An enclosure according to claim 5 wherein the valve control assembly is mounted on the equipment or apparatus supporting panel of the enclosure at a position remote from the fixture or fixtures in the enclosure.

7. An enclosure according to claim 5 wherein the valve control assembly is mounted on a side panel of the enclosure at a position remote from the fixture or fixtures in the enclosure.

* * * * *